July 5, 1955 E. S. V. PATTAMALY 2,712,598

WIRELESS BROADCASTING SYSTEMS

Filed May 21, 1951

INVENTOR

Elavathur S.V. Pattamaly

BY Ralph B. Stewart

ATTORNEY

United States Patent Office 2,712,598

Patented July 5, 1955

2,712,598

WIRELESS BROADCASTING SYSTEMS

Elavathur Subramanian Viswanathan Pattamaly, Kannimangalam, Nemmara, India

Application May 21, 1951, Serial No. 227,342

2 Claims. (Cl. 250—20)

Figure 1:
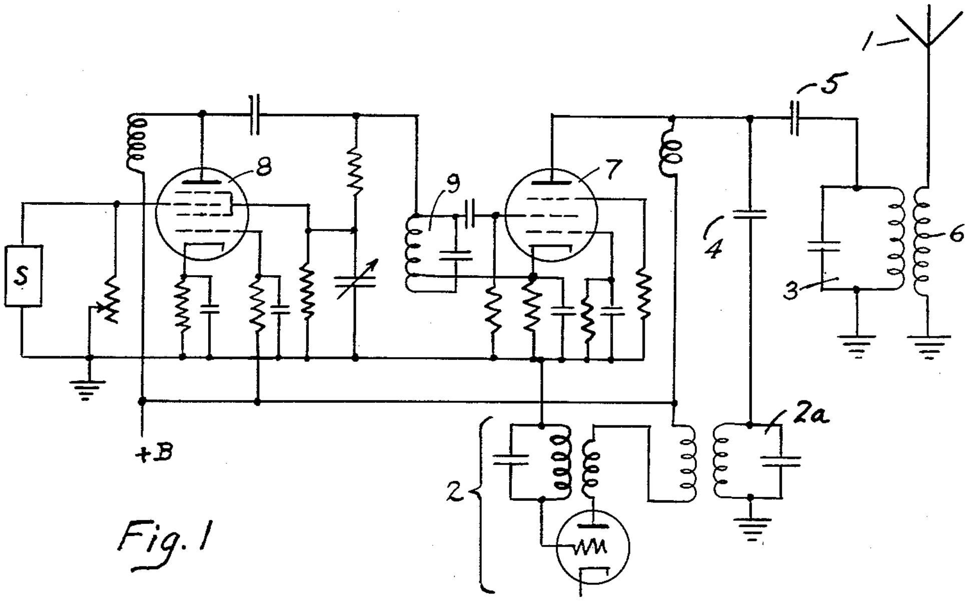

This invention relates to wireless broadcasting systems.

Two forms of broadcasting systems are in common use at the present time, that is, the amplitude modulation system and the frequency modulation system. In the amplitude modulation system, a carrier wave having a frequency within the radio frequency range is modulated in amplitude by the signal wave. This system of modulation has the advantage that the radio frequency carrier wave can be transmitted to great distances, but it has the disadvantage that the receiver is subject to disturbing noise impulses and the range of signal frequencies is also limited. In the frequency modulation system, the carrier wave is of a frequency much higher than the carrier employed in the amplitude modulation system, and its frequency is modulated in accordance with the amplitude variation of the signal wave. This system has the advantage that the receiver is not influenced by noise impulses and has an unlimited range of signal frequencies but it has the disadvantage that the carrier wave can be transmitted over short distances only.

An object of the present invention is to devise a broadcasting system having the advantages of both the amplitude modulation system and the frequency modulation system and to provide a method by which frequency-modulated signals can be transmitted and received at great distances.

The general principle underlying my invention may be enunciated thus:

In amplitude-modulation, a higher frequency is modulated by a lower frequency enabling the reception of either of the two frequencies within their respective distances of reception and as long as suitable circuits are designed for particular cases, there is no limit to the range of these two frequencies as distinguished from their respective distances of reception.

The main features of the transmitter of my invention are: Two frequencies are used in addition to the signal frequency, that these two frequencies are unequal, and the lower frequency amplitude-modulates the higher frequency which has the signal frequency frequency-modulated upon it.

The main features of the receiver of my invention are: The receiver is tuned to the lower of the two frequencies of the transmitter and, on demodulating the lower frequency, the higher frequency which contains the signal frequency frequency-modulated upon it is obtained.

For the purpose of explanation of this specification, the term "primary wave" shall mean the higher of the two frequencies to be used in the transmitter of my invention and shall be in the range of very high and ultra high frequencies.

According to my invention, the major portion of the energy of the wave which is radiated into space is generated as a wave having a frequency within the radio frequency range. This wave modulates the amplitude of a primary wave having a frequency within the very-high or ultra-high frequency bands. The frequency of the primary wave is varied or modulated in accordance with amplitude variations of the signal wave, which may be signals of Morse code, music, voice, television, telephone, teletype, etc.

At each receiving station the receiver is tuned to the transmitted radio frequency wave and the received radio frequency wave is supplied to a detector which derives the frequency modulated wave in the form of a wave of constant amplitude, and this wave is supplied to a discriminator which detects the signal wave.

Figure 2:
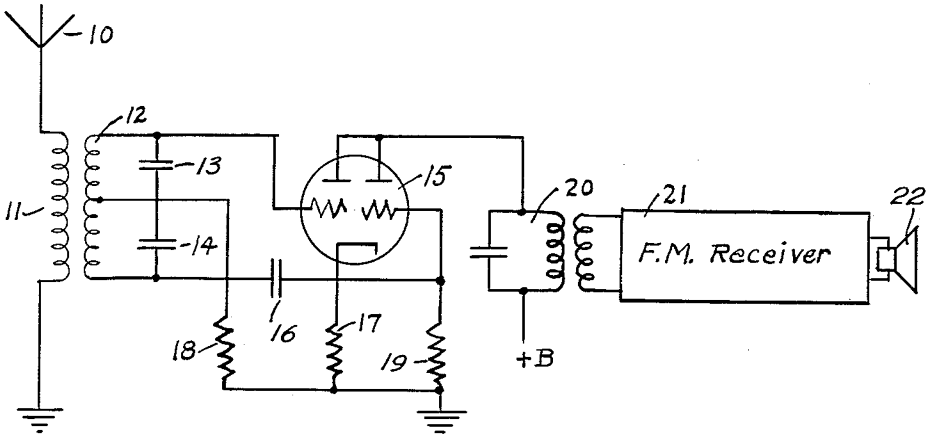

One form of my invention is illustrated in the accompanying drawing, in which Figure 1 is a circuit diagram showing a suitable modulating arrangement employed at the transmitting station, and Figure 2 is a circuit diagram illustrating a suitable detector circuit employed as a receiving station.

Referring to the drawing, the carrier wave which is radiated into space from antenna 1 is generated by a high-power oscillator 2. The frequency of this oscillator is selected to come within the radio frequency range of 5 to 20 megacycles, say 15 megacycles. Power from oscillator 2 is supplied to a tuned circuit 2$^a$ which energizes a second tuned circuit 3 through blocking condensers 4 and 5. Antenna 1 is coupled to circuit 3 by coil 6.

The carrier wave amplitude-modulates a primary wave, the modulation being accomplished in any well known manner. For example, a modulating tube 7, such as type 6SJ7, may have its cathode-to-plate path connected across the output of carrier oscillator 2 as shown.

The primary wave is generated by a variable frequency generator of any well known type, such as the circuit shown in Figure 1 and using a tube 8 of the 6L7 screen-grid type. This tube is connected in a well known manner to generate a primary wave having a frequency in the very-high or ultra-high frequency band. For example, the frequency may lie within the band of 30 to 150 megacycles, such as 100 megacycles. The signal wave to be broadcast is applied from source S to the screen grid of tube 8, and variation in the amplitude of the signal wave causes corresponding changes in the frequency of the primary wave.

The frequency modulated primary wave is applied from the plate circuit of tube 8 to a tuned circuit 9 which is connected between the grid and cathode of a modulator tube 7. This tube serves to amplitude-modulate the frequency-modulated primary wave and the resultant wave is radiated from antenna 1. The tube 7 may have its cathode-to-screen-grid path connected across the output of the carrier generator instead of the cathode-to-plate path as shown. The signal source may be of audible frequencies, such as voice currents, or telegraph signals, or it may be of higher frequencies, such as television signals, etc.

At the receiving station, the wave received on the antenna 10 is supplied through a coupling coil 11 to a second coil 12 having condensers 13 and 14 connected across opposite halves thereof. These condensers serve to tune the two halves of the coil 12 to the frequency of the carrier wave. The two ends of coil 12 are connected to the grids of a double-triode 15, the two plates of which are connected in parallel. A condenser 16 is included in one grid connection to displace the wave supplied to one grid by 90 degrees with respect to the wave supplied to the other grid. Biasing potential for the two grids is supplied by a cathode biasing resistor 17 connected in the lead of the tube 15. Biasing potential is applied to one grid through resistor 18 connected from one end of the resistor 17 to the center tap of coil 12, while the potential is applied to the other grid through resistor 19 connected between the negative end of resistor 14 and the other grid. The two plates of tube 15 are connected together and to one terminal of the parallel tuned circuit 20, the other terminal being connected to a source of plate current. The circuit 20 is broadly tuned to the normal primary frequency and is coupled to the input of a frequency modulation receiver 21 of conventional construction, including a frequency discriminator, and a signal device 22, such as a loud speaker, a television picture tube, etc.

The received wave is amplitude-demodulated by the circuit of the tube 15 and is supplied to receiver 21 as a wave of variable frequency but of substantially constant amplitude, and is then frequency-demodulated by the discriminator in receiver 21 to derive the original signal component which operates the signal device 22.

It will be obvious that the details of the modulating and demodulating arrangements may be varied without departing from the principle of my invention. Preferably the ratio of the primary frequency to the carrier frequency is rather large, such as 5 to 1 or higher.

I claim:

1. A detector circuit for a carrier wave which has amplitude-modulated a frequency-modulated primary wave comprising, a double triode having two anodes, and separate grids for controlling electron flow to said anodes, means connecting both anodes together in an output circuit, means for applying said carrier wave between the cathode and one grid, and means for applying said carrier wave between the cathode and the other grid in quadrature phase relation with respect to the wave applied to said first grid.

2. A detector circuit according to claim 1 and including a resonant circuit in the output of said double-triode and tuned broadly to the normal frequency of said primary wave, and a frequency discriminating detector coupled to said resonant circuit.

References Cited in the file of this patent

UNITED STATES PATENTS

| | | |
|---|---|---|
| 2,233,183 | Roder | Feb. 25, 1941 |
| 2,273,090 | Crosby | Feb. 17, 1942 |
| 2,283,575 | Roberts | May 19, 1942 |
| 2,286,442 | Schock | June 16, 1942 |
| 2,407,308 | Lorenzen | Sept. 10, 1946 |
| 2,512,530 | O'Brien | June 20, 1950 |
| 2,578,714 | Martin | Dec. 18, 1951 |